(12) United States Patent
Papastergiou et al.

(10) Patent No.: US 9,065,328 B2
(45) Date of Patent: Jun. 23, 2015

(54) AC/DC MULTICELL POWER CONVERTER FOR DUAL TERMINAL HVDC CONNECTION

(75) Inventors: Konstantinos Papastergiou, Geneva (CH); Georgios Stamatiou, Göteborg (SE)

(73) Assignee: ABB TECHNOLOGY AG, Zurich (CH)

( * ) Notice: Subject to any disclaimer, the term of this patent is extended or adjusted under 35 U.S.C. 154(b) by 0 days.

(21) Appl. No.: 14/358,692

(22) PCT Filed: Nov. 16, 2011

(86) PCT No.: PCT/EP2011/070222
§ 371 (c)(1),
(2), (4) Date: May 28, 2014

(87) PCT Pub. No.: WO2013/071962
PCT Pub. Date: May 23, 2013

(65) Prior Publication Data
US 2014/0375122 A1    Dec. 25, 2014

(51) Int. Cl.
*H02M 3/10*     (2006.01)
*H02J 1/10*     (2006.01)
(Continued)

(52) U.S. Cl.
CPC .............. *H02M 3/10* (2013.01); *Y10T 307/305* (2015.04); *H02J 1/102* (2013.01); *H02J 3/36* (2013.01); *H02M 7/49* (2013.01); *H02M 2001/009* (2013.01); *H02M 2007/4835* (2013.01);
(Continued)

(58) Field of Classification Search
CPC ........... H02M 3/10; H02M 7/48; H02M 7/12; H02M 7/49; H02M 3/155; H02M 2001/009; H02M 2007/4835; H02J 4/00; H02J 3/36; H02J 1/102; Y10T 307/305; Y02E 60/60
USPC .............................................. 307/151; 363/13
See application file for complete search history.

(56) References Cited

U.S. PATENT DOCUMENTS

| 8,345,457 | B2 * | 1/2013 | Asplund et al. ............... 363/132 |
| 2004/0095790 | A1 | 5/2004 | Bakran et al. |
| 2013/0181532 | A1 * | 7/2013 | KJ R .............................. 307/82 |

FOREIGN PATENT DOCUMENTS

| WO | WO 03/005551 A2 | 1/2003 |
| WO | WO 2009/149743 A1 | 12/2009 |

(Continued)

OTHER PUBLICATIONS

Knudsen et al., "Description and Prospective Applications of New Multi-Terminal HVDC System Concepts", Cigre Conf. Internationale Des Grands Reseaux Electriques, Aug. 26, 1990, pp. 1-11, XP000770178, Figures 3, 7a, 7b, 8, pp. 4, 6.

*Primary Examiner* — Daniel Cavallari
(74) *Attorney, Agent, or Firm* — Birch, Stewart, Kolasch & Birch, LLP

(57) ABSTRACT

It is presented a power converter for converting power between a first high voltage direct current, DC, connection, a second high voltage DC connection and a high voltage alternating current, AC, connection. The power converter comprises: a first phase arrangement comprising a first converter arm, a second converter arm, a third converter arm, a fourth converter arm, a fifth converter arm and a sixth converter arm. The first, second third and fourth converter arms are serially connected in the mentioned order between two terminals of the first high voltage DC connection. The high voltage AC connection is connected between the second converter arm and the third converter arm.

20 Claims, 4 Drawing Sheets

(51) Int. Cl.
   *H02J 3/36*      (2006.01)
   *H02M 7/49*      (2007.01)
   *H02J 4/00*      (2006.01)
   *H02M 7/12*      (2006.01)
   *H02M 7/48*      (2007.01)
   *H02M 1/00*      (2007.01)
   *H02M 7/483*     (2007.01)
   *H02M 3/155*     (2006.01)

(52) U.S. Cl.
   CPC ................ *Y02E60/60* (2013.01); *H02M 3/155* (2013.01); *H02J 4/00* (2013.01); *H02M 7/12* (2013.01); *H02M 7/48* (2013.01)

(56) References Cited

FOREIGN PATENT DOCUMENTS

| WO | WO 2010/069401 A1 | 6/2010 |
| WO | WO 2010/088969 A1 | 8/2010 |
| WO | WO 2010/145690 A1 | 12/2010 |
| WO | WO 2011/060812 A1 | 5/2011 |

* cited by examiner

AC/DC MULTICELL POWER CONVERTER FOR DUAL TERMINAL HVDC CONNECTION

TECHNICAL FIELD

The invention relates to high voltage power conversion.

BACKGROUND

High voltage power conversion between DC (direct current) and DC is required for a variety of different applications. One such application is for links related to HVDC (high voltage DC).

WO 2011/060812 presents a high voltage DC converter comprising at least one inductor and at least one chain-link converter connected between first and second DC terminals, the or each chain-link converter including a chain of modules in series, each module including one or more semiconductor switches and one or more energy storage devices. The semiconductor switches are controllable to provide a continuously variable voltage source wherein the or each chain-link converter is operable when DC networks are connected in use to the first and second DC terminals to control switching of the modules to selectively enable one DC network to charge the or each inductor, or enable the or each inductor to discharge into the other DC network.

However, there is a need to provide greater flexibility in power converters for high voltage applications.

SUMMARY

It is an objective of the present invention to alleviate a problem with the prior art discussed above.

In a first aspect, it is presented a power converter for converting power between a first high voltage direct current, DC, connection, a second high voltage DC connection and a high voltage alternating current, AC, connection. The power converter comprises: a first phase arrangement comprising a first converter arm, a second converter arm, a third converter arm, a fourth converter arm, a fifth converter arm and a sixth converter arm. The first, second third and fourth converter arms are serially connected in the mentioned order between two terminals of the first high voltage DC connection, and each one of the first, second, third, and fourth converter arms comprises a plurality of converter cells. The fifth converter arm is arranged between a first terminal of the second high voltage DC connection and a first connection point, being a point between the first converter arm and the second converter arm. The sixth converter arm is arranged between a second terminal of the second high voltage DC connection and a second connection point, being a point between the third converter arm and the fourth converter arm. The high voltage AC connection is connected between the second converter arm and the third converter arm.

Using this power converter, it is provided a high voltage three-way converter between two high voltage DC connections and a high voltage AC connection. This improves flexibility greatly and requires few extra components compared to a two-way converter between DC and DC or DC and AC. The power converter also allows power to flow in either direction in any of the three ports, as long as there is at least one power source and one power load.

The power converter may further comprise a first pair of capacitors arranged between the two terminals of the first high voltage DC connection and a second pair of capacitors arranged between the first terminal of the second high voltage DC connection and the second terminal of the second high voltage DC connection. This reduces voltage ripple on the first and second high voltage connections.

The first phase arrangement may further comprise a seventh converter arm and an eighth converter arm serially connected between the second converter arm and the third converter arm, wherein the high voltage AC connection is connected between a third connection point and fourth connection point, the third connection point being a point between the second converter arm and the seventh converter arm, and the fourth connection point being a point between third converter arm and the eighth converter arm. Using this arrangement, a bipole connection is provided on the second high voltage DC connection. This bipole connection can be bidirectional.

The power converter may further comprise a first transformer between the high voltage AC connection and the third connection point and a second transformer between the high voltage AC connection and the fourth connection point. The transformer allows for a voltage conversion and will also provide electrical insulation.

Each one of the cells of the converter arms may comprise at least one passive component and at least one active component.

Each one of the fifth and sixth converter arms may be arranged to be controlled in concert with the first, second, third and fourth converter arms. In other words, the conversion to (or from) the second high voltage DC connection is in harmony with the conversion to the high voltage AC connection.

Each one of the fifth and sixth converter arms may be arranged to detect an AC component of the first connection point and second connection point, respectively, and operate according to the detected AC component. With such an arrangement, the fifth and sixth converter arms adapt to waveforms at the first and second connection points and thus require less or no external operational control, e.g. from an external controller.

The power converter may further comprise a second phase arrangement of the same structure as the first phase arrangement and a third phase arrangement of the same structure as the first phase arrangement. The multiple phases complement each other to reduce any ripple on the first and second high voltage DC connections, which thereby reduces the need for any capacitors on the high voltage DC connections. Fewer or more phase arrangements can be included to support fewer or more phases. More phases reduce any ripple on the first and second high voltage DC connections even further.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
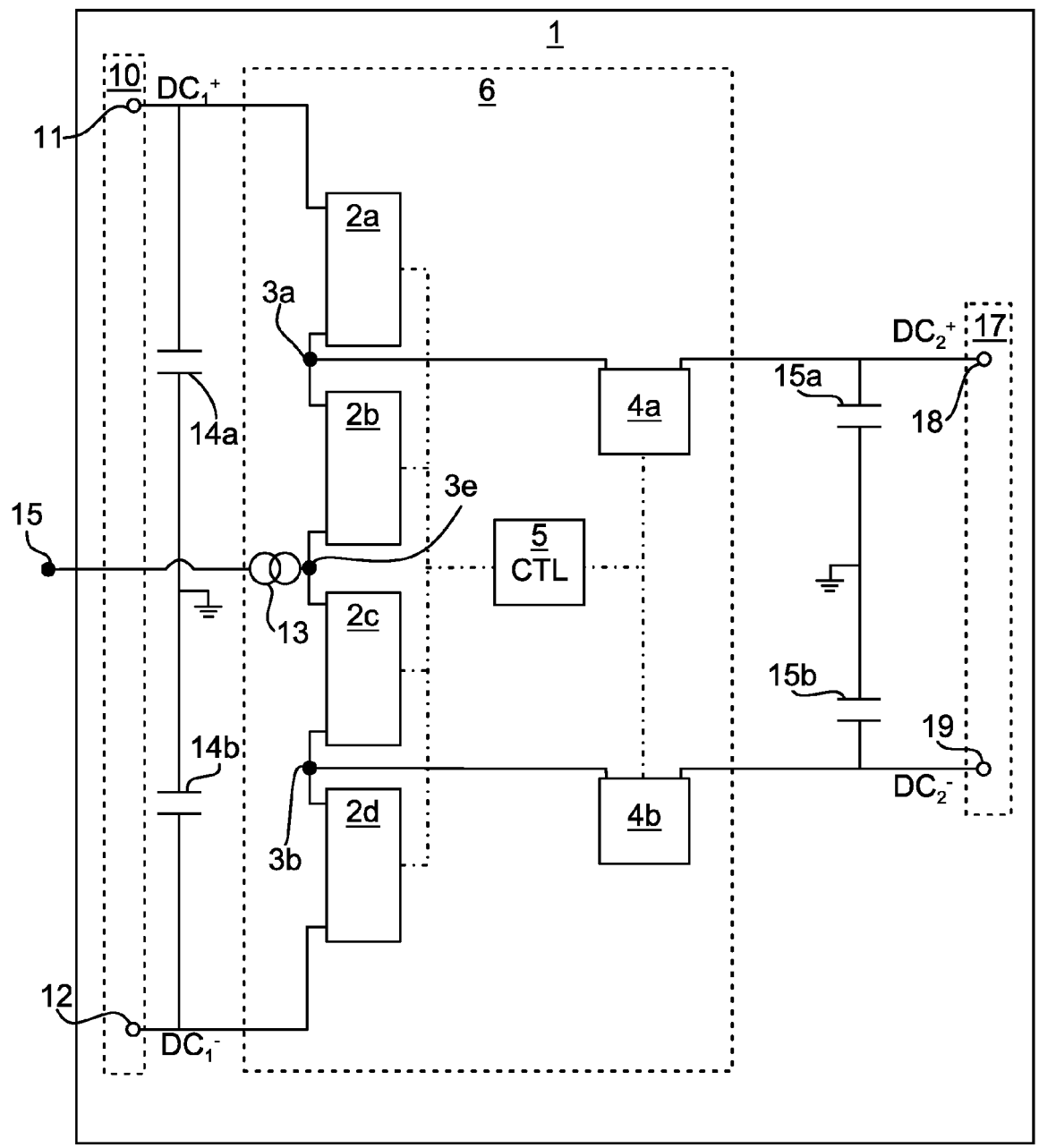
FIG. 1 is a schematic diagram illustrating one embodiment of a power converter.

FIG. 1 is a schematic diagram illustrating one embodiment of a power converter 1. The power converter has a first high voltage DC connection 10 with two terminals 11, 12 and a second high voltage connection 17 with two terminals 18, 19. Furthermore, there is a high voltage AC connection 15.

The power converter is arranged to convert power to or from any of these connections 10, 17, 15 in any suitable way as long as there is at least one power source and one power load. For example, the first high voltage DC connection 10 can be connected to a power source and the second high voltage DC connection 17 can be connected to a power load while the high voltage AC connection 15 is connected to a power load. In another example, the first high voltage DC connection 10 can be connected to a power load and the second high voltage DC connection 17 can be connected to a power source while the high voltage AC connection 15 is connected to a power source. In a third example, the first high voltage DC connection 10 can be connected to a power source and the second high voltage DC connection 17 can also be connected to a power source while the high voltage AC connection 15 is connected to a power load. A shift between power flow configurations can occur dynamically.

The power assembly 1 comprises a first phase arrangement 6 comprising a first converter arm 2a, a second converter arm 2b, a third converter arm 2c, a fourth converter arm 2d, a fifth converter arm 4a and a sixth converter arm 4b. Furthermore, the power assembly 1 comprises a controller 5, internal or external to the first phase arrangement 6.

The first, second third and fourth converter arms 2a-d are serially connected in the mentioned order between two terminals 11, 12 of the first high voltage DC connection 10. Furthermore, as will be shown in more detail below, each one of the first, second, third, and fourth converter arms 2a-d comprises a plurality of converter cells.

The fifth converter arm 4a is arranged between the first terminal 18 of the second high voltage DC connection 17 and a first connection point 3a, being a point between the first converter arm 2a and the second converter arm 2b. Analogously, the sixth converter arm 4b is arranged between the second terminal 19 of the second high voltage DC connection 17 and a second connection point 3b, being a point between the third converter arm 2c and the fourth converter arm 2d. Both the fifth and the sixth converter arms 4a-b are controlled by the controller 5.

The fifth and sixth converter arms 4a-b operate (in an example when transferring power to the second high voltage DC connection 17) to remove e.g. by counteracting, any AC component at the respective connection points 3a-b. See FIGS. 2A-B for the voltage at these connection points 3a-b. Hence, the voltage on the right hand side is simply the DC bias of the voltage at the respective connection points 3a-b, i.e. $v_1$ for the first terminal 18 and $v_2$ for the second terminal 19 of the second high voltage DC connection 17. When the power transfer occurs from the second high voltage DC connection 17, the fifth and sixth converter arms 4a-b add a suitable AC component to the DC bias provided on the terminals 18, 19 of the second high voltage connection 17. The control of the fifth and sixth converter arms 4a-b can be a centralised control from the controller 15, or an adaptive control based on sensors on either side of the respective AC/DC converters 4a-b.

Optionally, inductors or other filters (not shown) can be provided between the either or both terminals 11, 12 of the first high voltage DC connection 10.

The high voltage AC connection 15 is connected, via an optional transformer 13, to a an AC connection point 3e, being in the middle of the serial line of converter arms 2a-2d, i.e. between the second converter arm 2b and the third converter arm 2c.

Capacitors 14a-b are provided serially between the two terminals 11, 12 of the first DC connection 10, with a ground connection between the two capacitors 14a-b. The capacitors 14a-b act to reduce voltage ripple on the first DC connection 10 and to enable a complete AC circuit through the capacitors 14a-b and the converter arms 2a-d. This enables active power transfer through the converter arms 2a, 2d, 4a and 4b and balances power in these. Analogously, capacitors 15a-b are optionally provided serially between the two terminals 18, 19 of the second DC connection 17, with a ground connection between the two capacitors 15a-b, in order to reduce voltage ripple on the second DC connection 17.

The controller 5 can be a central processing unit (CPU), a digital signal processor (DSP), application specific integrated circuit (ASIC), field programmable gate array (FPGA) or any other type of controller capable of controlling the converters 2a-d, 4a-b to achieve desired conversion.

Figure 2A:
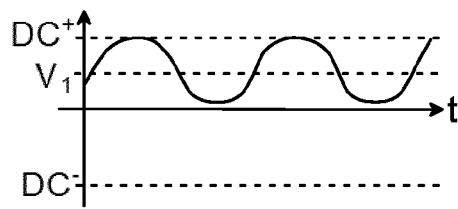
FIGS. 2A-C are schematic graphs illustrating voltages at various points of the power converter of FIG. 1.
Figure 2B:
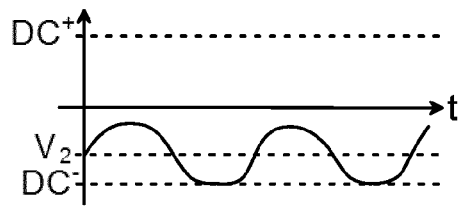
Figure 2C:
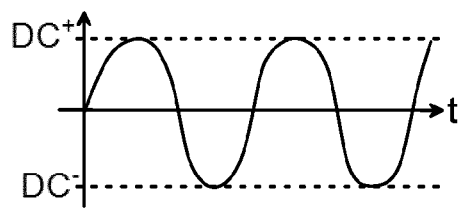

FIGS. 2A-C are schematic graphs illustrating voltages at various points of the power converter of FIG. 1. With combined reference to FIG. 1, FIG. 2A is a schematic graph of the voltage at the first connection point 3a, FIG. 2B is a schematic graph of the voltage at the second connection point 3b and FIG. 2C is a schematic graph of the voltage at the AC connection point 3e.

As can be seen, all voltage of FIGS. 2A-C are in phase. In other words, the serially connected converter arms 2a-d work in concert under control of the controller 15. Since there is a voltage division between the converter arms 2a-d, there is a positive DC bias $V_1$ of the voltage at the first connection point 3a, as seen in FIG. 2A. Analogously, there is a negative DC bias $V_2$ of the voltage at the second connection point 3b, as seen in FIG. 2C. The voltage at the AC connection point 3e, being in the middle, has no DC bias, as seen in FIG. 2C.

Figure 3A:
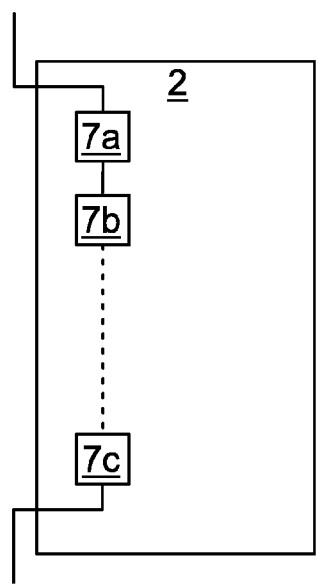
FIGS. 3A-B are schematic diagrams illustrating embodiments of converter arms of the power converter of FIG. 1.
Figure 3B:
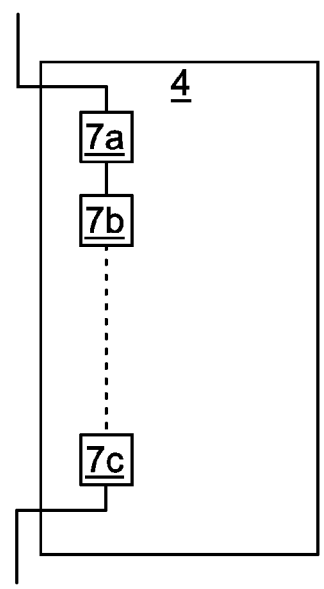

FIGS. 3A-B are schematic diagram illustrating embodiments of converter arms of the power converter of FIG. 1. FIG. 3A illustrates the structure of any one of the converter arms 2a-d, here represented by a single converter arm 2. The converter arm comprises a plurality of converter cells 7a-c, wherein each converter cell 7a-c is controlled by the controller 15. The converter cells 7a-c can be connected in series to increase voltage rating or in parallel to increase currency rating. The serially connected converter cells 7a-c can optionally be individually controlled to achieve a more sinusoidal power conversion on the AC side. While the converter arm is here illustrated to have three converter cells 7a-c, any number of cells are possible, including one, two, three or more. In one embodiment, the number of cells in each converter arm is in the range of 30 to 150 converter cells.

FIG. 3B illustrates the structure of any one of the converter arms 4a-b, here represented by a single converter arm 4. The converter cells of this converter arm 4 have the same possible configurations as the converter arm 2 of FIG. 3A, but can be of a different actual configuration than the converter arm 2 of FIG. 3A.

Figures 4A, 4B, 4C:
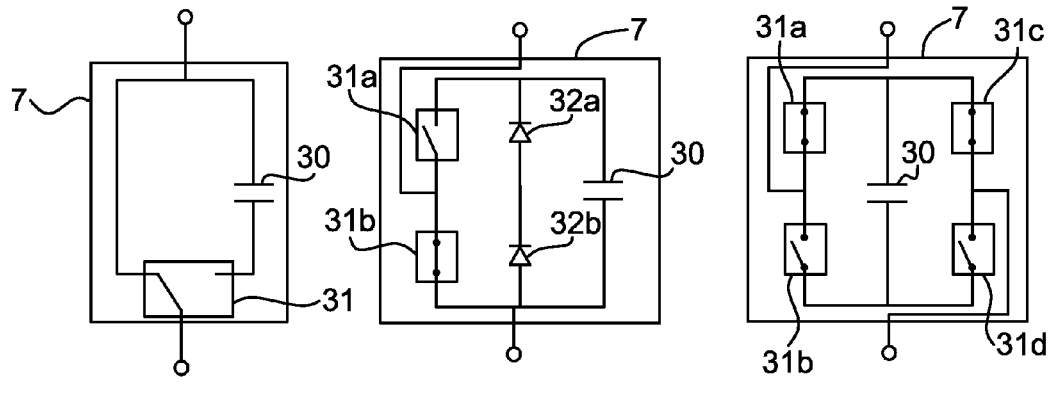
FIGS. 4A-C are schematic diagrams illustrating embodiments of converter cells of the converter arms of FIGS. 3A-B.

FIG. 4A-C are schematic diagrams illustrating embodiments of converter cells 7a-c of the converter arms of FIGS. 3A-B. Any of the cells are here represented as a single converter cell 7. A converter cell 7 is a combination of semiconductor switches, such as transistors, and energy storing elements, such as capacitors, supercapacitors, inductors, batteries, etc. Optionally, a cell can be a multilevel converter structure such as a flying capacitor or NPC (Neutral-Point-Clamped) multilevel structure.

FIG. 4A illustrates a converter cell comprising an active component in the form of a switch 31 and a passive component in the form of a capacitor 30. The switch 31 can for example be implemented using an insulated gate bipolar transistor (IGBT), Integrated Gate-Commutated Thyristor (IGCT), a Gate Turn-Off thyristor (GTO), or any other suitable high power semiconductor component.

FIG. 4B illustrates a converter cell 7 implementing a half bridge structure. The converter cell 7 here comprises two active components in the form of switches 31a-b, e.g. IGBTs, IGCTs, GTOs, etc., connected serially. Two diodes 32a-b are each connected in serially in parallel with the serially connected two switches 31a-b. A capacitor 30 is also provided in parallel across both transistors 31a-b and both diodes 32a-b.

FIG. 4C illustrates a converter cell 7 implementing a full bridge structure. The converter cell 7 here comprises four switches 31a-d, e.g. IGBTs, IGCTs, GTOs, etc., connected serially A capacitor 30 is also provided in parallel across the a first leg of two transistors 31a-b and a second leg of two transistors 31c-d. Compared to the half bridge of FIG. 4B, the full bridge structure allows the voltage across it to be reversed.

Figure 5:
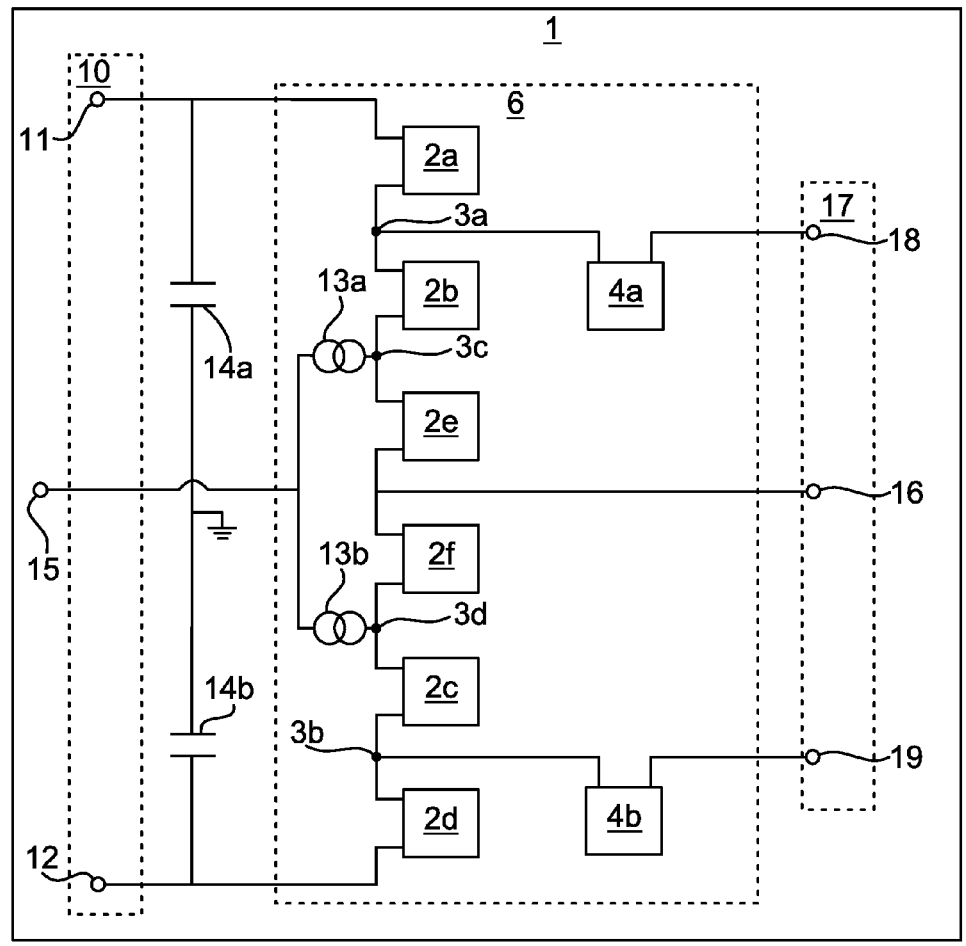
FIG. 5 is a schematic diagram illustrating an alternative embodiment of a power converter.

FIG. 5 is a schematic diagram illustrating an alternative embodiment of a power converter, where the second high voltage DC connection 17 is a bipole connection, provided with a neutral terminal 16. To achieve this, the first phase arrangement 6 further comprises a seventh converter arm 2e and an eighth converter arm 2f serially connected between the second converter arm 2b and the third converter arm 2c. The seventh converter arm 2e and the eighth converter arm 2f are controlled such that the voltage of the middle point, between the two central converters 2e-f is essentially 0.

Hence, the middle point can not be used for the high voltage AC connection 15. Instead, the AC connection 15 is connected to a third connection point 3c and fourth connection point 3d. The third connection point 3c is a point between the second converter arm 2b and the seventh converter arm 2e, and the fourth connection point 3d is a point between third converter arm 2c and the eighth converter arm 2f. Optionally, two respective transformers 13-b are provided between the third connection point 3c and the high voltage AC connection point 15, and the fourth connection point 3d and the high voltage AC connection point 15.

Figure 6:
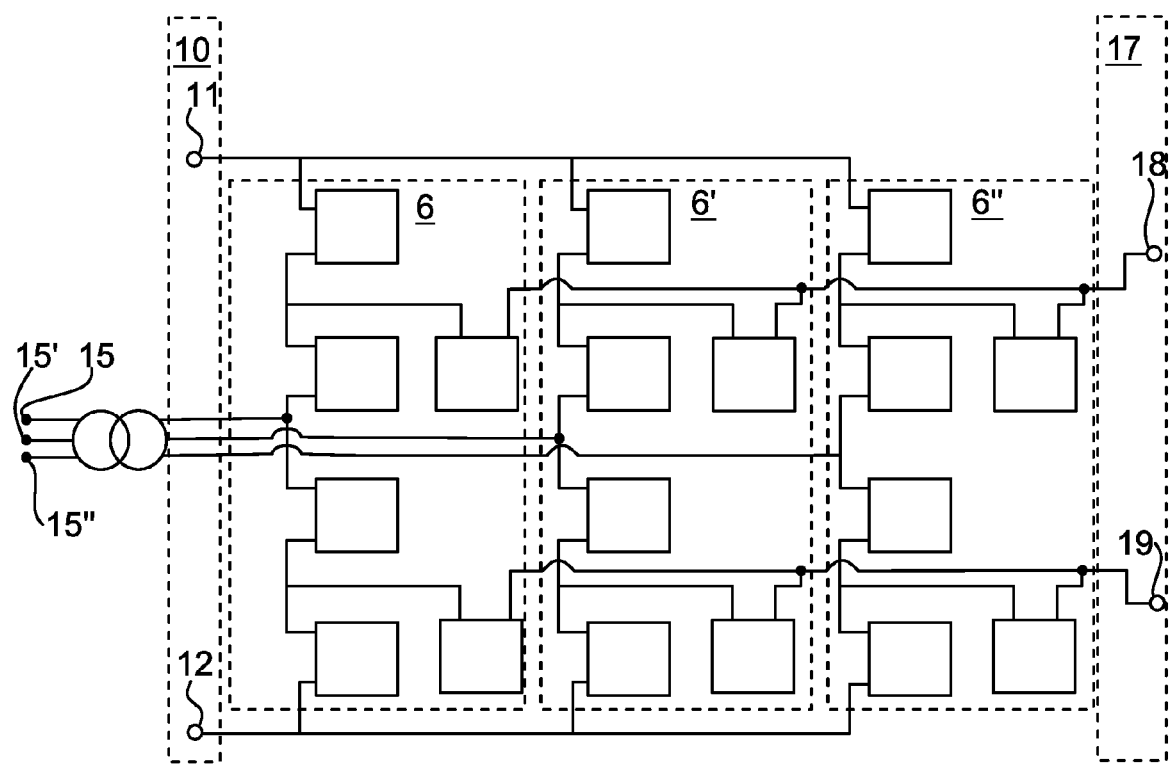
FIG. 6 is a schematic diagram illustrating three phase arrangements of FIG. 1 connected to provide three phases.

FIG. 6 is a schematic diagram illustrating three phase arrangements of FIG. 1 connected to provide three phases. A second phase arrangement 6' is provided having the same structure as the first phase arrangement 6 and a third phase arrangement 6" is provided also having the same structure as the first phase arrangement 6. In this way, a full three phase high voltage AC connection is provided using three AC terminals 15', 15", 15"'. Through the compensary nature of multiple phases, this arrangement also reduces ripple on the high voltage DC connections 10, 17. Moreover, the multiple phases provide complete AC circuits, reducing the need for any capacitors on the high voltage DC connections 10, 17.

The embodiment of FIG. 6 can be adjusted by including fewer or more phase arrangements to support fewer or more phases. More phases reduce any ripple on the DC connections 10, 17 even further.

Analogously, the phase arrangement in FIG. 5, implementing the monopole to bipole connection, can be expanded to several phases.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A power converter for converting power between a first high voltage direct current, DC, connection, a second high voltage DC connection and a high voltage alternating current, AC, connection, the power converter comprising:
   a first phase arrangement comprising a first converter arm, a second converter arm, a third converter arm, a fourth converter arm, a fifth converter arm and a sixth converter arm;
   wherein the first, second third and fourth converter arms are serially connected in the mentioned order between two terminals of the first high voltage DC connection, and each one of the first, second, third, fourth, fifth and sixth converter arms comprises a plurality of converter cells, wherein each of the converter cells is a combination of semiconductor switches and energy storing elements;
   the fifth converter arm is arranged between a first terminal of the second high voltage DC connection and a first connection point, being a point between the first converter arm and the second converter arm;
   the sixth converter arm is arranged between a second terminal of the second high voltage DC connection and a second connection point, being a point between the third converter arm and the fourth converter arm; and
   the high voltage AC connection is connected between the second converter arm and the third converter arm,
   wherein each one of the fifth and sixth converter arms are arranged to detect an AC component of the first connection point and second connection point, respectively, and operate according to the detected AC component to remove any AC component at the respective connection points or to add a suitable AC component depending on the direction of power transfer at the second high voltage DC connection.

2. The power converter according to claim 1, further comprising a first pair of capacitors arranged between the two terminals of the first high voltage DC connection and a second pair of capacitors arranged between the first terminal of the second high voltage DC connection and the second terminal of the second high voltage DC connection.

3. The power converter according to claim 1, wherein the AC connection is connected to an AC connection point, in the middle of the serial line of converter arms.

4. The power converter according to claim 1, wherein the first phase arrangement further comprises a seventh converter arm and an eighth converter arm serially connected between the second converter arm and the third converter arm, and the high voltage AC connection is connected between a third connection point and fourth connection point, the third connection point being a point between the second converter arm and the seventh converter arm, and the fourth connection point being a point between third converter arm and the eighth converter arm, and further comprising a first transformer between the high voltage AC connection and the third connection point and a second transformer between the high voltage AC connection and the fourth connection point.

5. The power converter according to claim 1, wherein each one of the cells of the converter arms comprises at least one passive component and at least one active component.

6. The power converter according to claim 1, further comprises a controller configured to control each one of the fifth and sixth converter arms to be in concert with the first, second, third and fourth converter arms.

7. The power converter according to claim 1, further comprising a second phase arrangement of the same structure as the first phase arrangement and a third phase arrangement of the same structure as the first phase arrangement.

8. The power converter according to claim 2, wherein the AC connection is connected to an AC connection point, in the middle of the serial line of converter arms.

9. The power converter according to claim 2, wherein the first phase arrangement further comprises a seventh converter arm and an eighth converter arm serially connected between the second converter arm and the third converter arm, and the high voltage AC connection is connected between a third connection point and fourth connection point, the third connection point being a point between the second converter arm and the seventh converter arm, and the fourth connection point being a point between third converter arm and the eighth converter arm, and further comprising a first transformer between the high voltage AC connection and the third connection point and a second transformer between the high voltage AC connection and the fourth connection point.

10. The power converter according to claim 2, wherein each one of the cells of the converter arms comprises at least one passive component and at least one active component.

11. The power converter according to claim 3, wherein each one of the cells of the converter arms comprises at least one passive component and at least one active component.

12. The power converter according to claim 4, wherein each one of the cells of the converter arms comprises at least one passive component and at least one active component.

13. The power converter according to claim 2, further comprises a controller configured to control each one of the fifth and sixth converter arms to be in concert with the first, second, third and fourth converter arms.

14. The power converter according to claim 3, further comprises a controller configured to control each one of the fifth and sixth converter arms to be in concert with the first, second, third and fourth converter arms.

15. The power converter according to claim 4, further comprises a controller configured to control each one of the fifth and sixth converter arms to be in concert with the first, second, third and fourth converter arms.

16. The power converter according to claim 5, further comprises a controller configured to control each one of the fifth and sixth converter arms to be in concert with the first, second, third and fourth converter arms.

17. The power converter according to claim 2, further comprising a second phase arrangement of the same structure as the first phase arrangement and a third phase arrangement of the same structure as the first phase arrangement.

18. The power converter according to claim 3, further comprising a second phase arrangement of the same structure as the first phase arrangement and a third phase arrangement of the same structure as the first phase arrangement.

19. The power converter according to claim 4, further comprising a second phase arrangement of the same structure as the first phase arrangement and a third phase arrangement of the same structure as the first phase arrangement.

20. The power converter according to claim 5, further comprising a second phase arrangement of the same structure as the first phase arrangement and a third phase arrangement of the same structure as the first phase arrangement.

* * * * *